Oct. 21, 1941.                 E. G. MORRISON                 2,260,189
                                    BRAKE
                             Filed Aug. 2, 1940
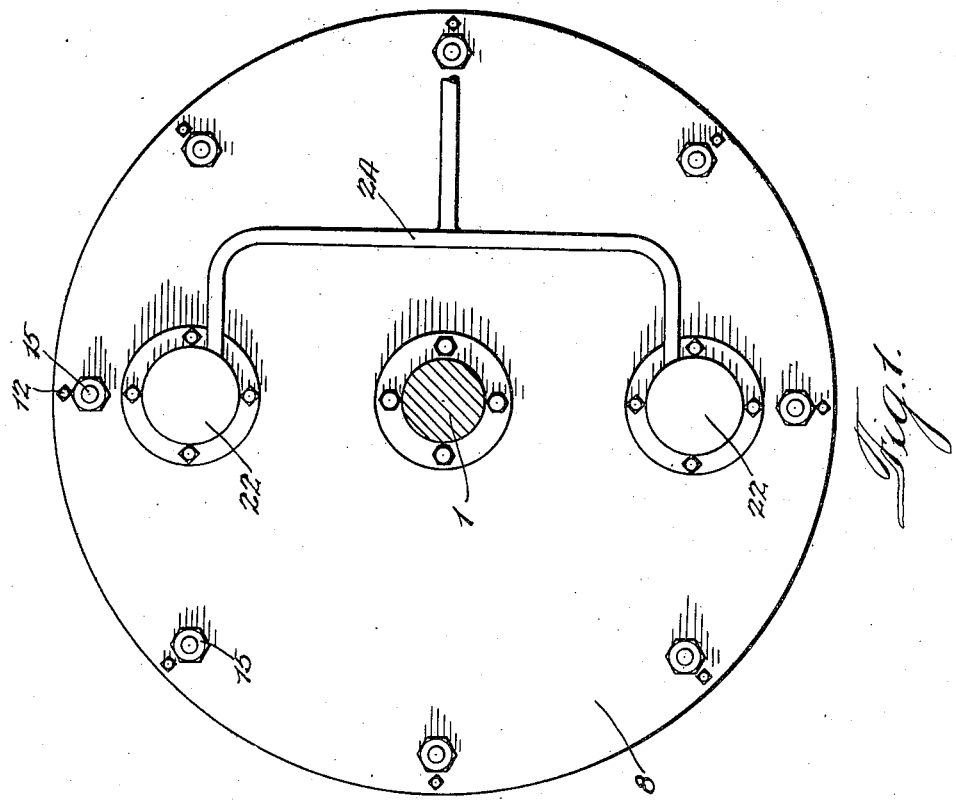
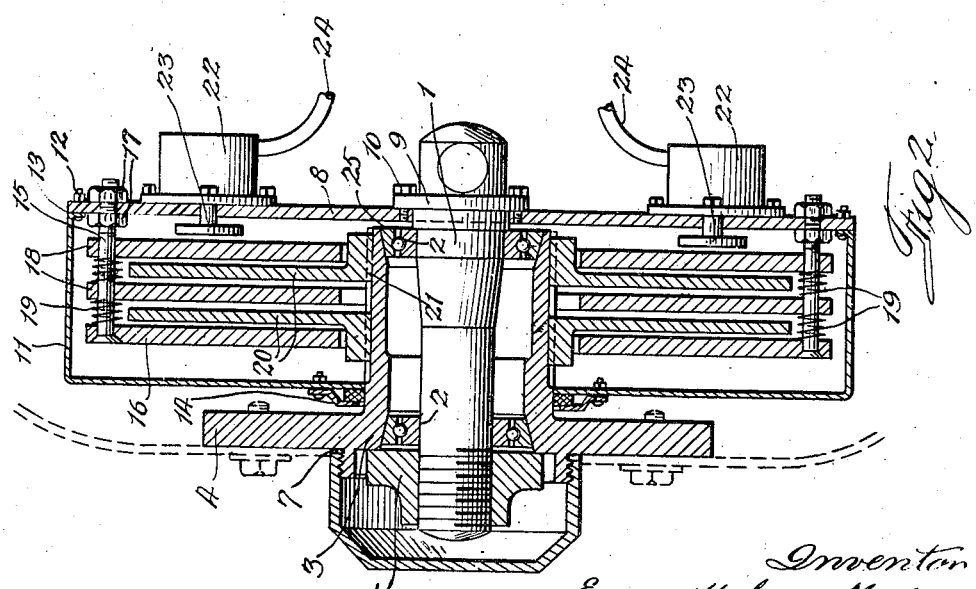
Inventor
Emmett George Morrison
By Thiess, Olson & Mecklenburger
Attys.

Patented Oct. 21, 1941

2,260,189

UNITED STATES PATENT OFFICE 2,260,189

BRAKE

Emmett George Morrison, Elgin, Ill.

Application August 2, 1940, Serial No. 349,645

5 Claims. (Cl. 188—18)

This invention relates to vehicle brakes and more particularly to brakes adapted for use in connection with automobiles and trucks.

It is an object of the present invention to provide a brake mounted substantially entirely within the wheel of the vehicle and which will be of small size with exceptionally large braking surfaces and other braking characteristics which are more effective than the conventional brake of the drum and shoe type.

It is also an object to provide an entirely self-lubricating brake in which all of the moving parts may run in oil and in which the oil reservoir is in communication with the wheel bearings to provide continuous lubrication thereof.

It is also an object to provide a brake of the hydraulic type which is so constructed that the brake cylinders, including the master cylinder, may be of a minimum size and the brake may be operated with a very slight amount of pressure on the brake pedal or other control.

It is also an object to provide a brake which may be manufactured as a completely assembled unit and adjusted at the factory and which is then in condition for installation without any further adjustment or testing; also in which the entire brake mechanism, including the housing, may be removed with the wheel if desired.

A further object is to provide a brake, preferably of the hydraulic type and running in oil, in which the entire brake may be mounted on the axle spindle and which will not interfere with the removal and replacement of the wheel, and also in which the hub itself may easily be removed and replaced if desired.

Another object is the provision of a brake of the character described which will be of few parts, cheap to manufacture, easy to install, and which will not easily get out of order.

Further objects will be apparent from the specification and the appended claims.

In the drawing:

Fig. 1 is a back view of one embodiment of the invention with the spindle or axle shown in section.

Fig. 2 is an axial sectional view taken on a line substantially corresponding to line 2—2 of Fig. 1.

Referring to the drawing in detail, the embodiment illustrated comprises the usual spindle 1 having suitable bearings 2 thereon, on which is mounted a wheel hub 3. The wheel hub is provided with an annular flange 4, on which latter the usual automobile wheel may removably be mounted by means of bolts or screws in the ordinary well known manner. The spindle 1 is provided with the usual hub retaining nut 5, and a hub cap 6 is removably secured to the hub and provided with an oil seal 7. The cap 6 may be threaded onto the hub as shown or secured in any other well known manner.

A brake housing or drum is mounted on the spindle and comprises a stationary plate 8 removably secured to the spindle flange 9 by means of bolts or screws 10. A drum-like casing member 11 is secured to the inner side of the plate 8 by means of bolts 12, and an oil seal is provided therebetween at 13. The outer wall of the casing 11 is provided with an axial opening through which the hub 3 extends, and an oil seal, such for instance as a felt washer 14, is retained on the casing, as illustrated, and effectively prevents oil leakage therefrom as long as the hub is on the spindle. Outwardly extending stud bolts 15 are secured to the stationary plate or housing member 8 and an outer pressure plate 16 is rigidly secured to the outer ends of these studs and surrounds the hub. The plate 16 may be adjusted laterally and rigidly secured in place by means of nuts 17 on the bolts 15.

The present embodiment illustrates a multiple disc brake. However, it will be apparent that one or more discs may be used, as desired, without any material change in the general construction of the device. In any case, one or more laterally movable pressure plates 18 are supported on the bolts 15, whereby they are fixed against rotation, and springs 19 are mounted therebetween and tend to separate the friction surfaces of the brake. Friction discs 20 are positioned between the respective pairs of fixed pressure plates, and these discs 20 are splined on the hub 3, as shown at 21, to rotate with the wheel.

In the present embodiment, the distance between the friction surfaces has been greatly exaggerated for purposes of illustration. However, it will be understood that, in this type of brake, the lateral movement of the friction discs and plates may be very slight. Therefore, only a very short movement of an operating means is required to operate the brake. This short movement is very desirable in the embodiment illustrated, which is particularly adapted for hydraulic operation, although it will be apparent that other methods of control may be used if desired. In the present instance, hydraulic cylinders 22 are mounted on the fixed plate 8 and plungers 23 extend therethrough and into the drum and engage the adjacent fixed pressure plate 18. Due to the slight movement of the plates necessary in any braking operation, the hydraulic device 22 may, if desired, be of the sealed diaphragm type, thereby eliminating the possibility of leakage of the brake fluid. The cylinders 22 may be connected to the usual pedal-operated master cylinder by means of a conduit 24. The hydraulic cylinders 22 are placed on the back of the stationary plate 8. Therefore, it is possible to use any desired number of cylinders for heavy duty applications without increasing the diameter of the brake assembly.

As previously stated, the present invention provides a brake which is adapted to be run in oil, if desired, and the same body of oil may lubricate the wheel bearings. For this purpose the plate 18 is spaced slightly from the end of the hub 3 to provide an oil passage 25 communicating with the wheel bearings, as shown. Lubrication of both brake and wheel bearings may be accomplished either by maintaining a predetermined oil level in the housing, or the brake only may be lubricated by using an oil bearing metal as a facing on both sides of the friction disc or discs, or on all friction surfaces. The fact that all moving parts run in oil eliminates air and also provides a smooth and uniform braking action during the entire life of any vehicle to which it may be applied. Also, the leakproof housing is, of course, also dustproof and moistureproof, which is of material advantage over the usual drum type brake. These features eliminate variation in braking effect, which is inherent in the usual types of vehicle brakes. Both sides of each disc are used as braking surfaces and, because these braking surfaces are continuously lubricated, no lining is required.

The particular method of mounting the various elements, that is, with the housing and pressure plates supported on the spindle and the friction discs splined to the hub, provides a construction whereby the wheel or brake, or the wheel and brake assembly, may easily be removed without disturbing the relationship of the brake elements.

In the present embodiment the entire housing and brake assembly therein are positioned in the transverse plane of the spindle and may, therefore, be completely within the general outer contour of the usual automobile wheel. Also, the entire assembly, including the hub, bearings, and brake, may be removed from the spindle as a unit merely by disconnecting the hydraulic conduits and removing the screws 10.

Another important feature of the construction is that the stationary housing eliminates the necessity for a heavy revolving brake drum on the wheel. Such drums are in many cases responsible for wheels being out of balance.

It is intended, of course, that the invention should not be limited to the specific embodiment or embodiments disclosed herein, since modifications may be made, and it is contemplated, therefore, by the appended claims to cover any such modifications as fall within the true spirit and scope of this invention.

Having thus described this invention, what is claimed and desired to be secured by Letters Patent is:

1. A vehicle brake assembly for a wheel spindle having a flange or shoulder adjacent its inner end, a wheel hub on said spindle and having the usual wheel supporting flange adjacent its outer end, a brake housing axially mounted over said spindle and hub and removably secured to the outer side of said spindle flange, the outer wall of said housing being closely adjacent said hub flange and having an oil seal around said hub so as to form a sealed oil chamber around said hub and said spindle, a brake completely enclosed by said housing and comprising axially mounted co-operating pressure plates and friction discs operatively connected between said housing and said hub, and means on said housing for controlling said brake, said housing, said brake and brake controlling means, and said hub being mountable on said spindle, and demountable therefrom as an assembled unit by axial movement.

2. In an automobile brake, the combination with a spindle having the usual hub with outer wheel flange and the usual bearings for said hub all mounted on said spindle, of a stationary housing on said spindle and extending outwardly over said hub and closely adjacent said flange, an oil seal between said housing and said hub, a friction clutch in said housing, said clutch comprising nonrotatable plates mounted on said housing and one or more friction discs nonrotatably secured on said hub, means for clamping said plates and said disc frictionally together, said housing providing an oil chamber for said clutch and a passage for oil from said chamber to said hub bearings.

3. In an automobile brake, the combination with a spindle having the usual hub with outer wheel flange and the usual bearings for said hub all mounted on said spindle, of a stationary housing on said spindle and extending outwardly over said hub and closely adjacent said flange, an oil seal between said housing and said hub, whereby said hub, said spindle, and said housing together provide a single oil chamber with said bearings and a major portion of said hub therein, nonrotatable pressure plates in said chamber, resilient means tending to separate said plates, one or more friction discs on said hub and secured for rotation therewith, and control means on said housing for movement of at least one of said plates to apply braking pressure to said discs.

4. In an automobile brake, the combination with a wheel having an inwardly extending hub and supported on the usual spindle, a nonrotatable brake drum or housing secured closely adjacent the inner end of said hub and extending a material distance thereover with its outer wall having an axial opening for the insertion and removal of said hub, a plurality of pressure plates in said drum around said hub and secured against rotation, a plurality of friction discs secured to said hub for rotation therewith and axial movement thereon and interleaved with said pressure plates, means tending to separate said pressure plates, and control means on said drum for clamping all of said plates and discs together in frictional braking relation.

5. An automobile brake comprising a stationary housing mounted on the rear of the usual spindle and extending outwardly thereover so that the housing is substantially in alignment with the tread of the usual automobile wheel, the outer wall of said housing having an axial opening to enable the insertion and removal of a wheel hub, a removable wheel hub on said spindle, nonrotatable pressure plates in said housing surrounding said hub, a clutch disc between said plates and having an axial opening to removably receive said hub, said hub and said disc having co-operating means for driving said disc with said hub while permitting free axial movement of said disc thereon, and means on said housing for operative connection to a brake pedal to move said pressure plates to clamp said disc.

EMMETT GEORGE MORRISON.